United States Patent [19] — Yao

[11] 3,708,688

[45] Jan. 2, 1973

[54] CIRCUIT FOR ELIMINATING SPURIOUS OUTPUTS DUE TO INTERELECTRODE CAPACITANCE IN DRIVER IGFET CIRCUITS

[75] Inventor: Ying Luh Yao, Mahopac, N.Y.

[73] Assignee: International Business Machines Corporation, Armonk, N.Y.

[22] Filed: June 15, 1971

[21] Appl. No.: 153,323

[52] U.S. Cl. ....................307/205, 307/208, 307/237

[51] Int. Cl. ..............................................H03k 19/08

[58] Field of Search......307/205, 208, 213, 214, 237, 307/246, 251, 270, 304

[56] References Cited

UNITED STATES PATENTS

| | | | |
|---|---|---|---|
| 3,588,537 | 6/1971 | Brink | 307/205 X |
| 3,564,299 | 2/1971 | Varadi | 307/205 X |
| 3,567,968 | 3/1971 | Booher | 307/205 X |

*Primary Examiner*—John Zazworsky
*Attorney*—T. J. Kilgannon, Jr. et al.

[57] ABSTRACT

A number of field effect transistor circuits for driving loads having large capacitances is disclosed. Where insulated gate field effect transistors having relatively large driving current requirements are utilized, the interelectrode capacitances present are of such magnitude that, when the output circuit is energized from clocked sources normally OFF devices are turned ON providing spurious outputs. Circuit arrangements are provided for maintaining normally OFF devices in that condition during a portion of a given clock cycle by clamping an electrode (the gate of an FET) to a desired value while simultaneously isolating the clamped device or devices from changing potentials which may result from premature changes at the input of the circuit or elsewhere in the circuit. An inverter driver and an interface circuit for dynamic to static logic are shown.

14 Claims, 5 Drawing Figures

INVENTOR
YING L. YAO

BY Thomas J. Kilgannon Jr.
ATTORNEY

CIRCUIT FOR ELIMINATING SPURIOUS OUTPUTS DUE TO INTERELECTRODE CAPACITANCE IN DRIVER IGFET CIRCUITS

BACKGROUND OF THE INVENTION

1. Field of the Invention

This invention relates generally to transistorized driver circuits for use in dynamic logic circuits which are adapted to driving loads having large capacitances. More specifically, it relates to field effect transistor driver circuits utilized to drive large capacitances which are subject to providing spurious outputs due to the charging of input device gate capacitances which, at a given instant, are desired to be in a low potential or discharged state. Still more specifically, this invention relates to clocked clamping circuits which are activated to maintain the gate capacitances of the input device of the driver circuits in a discharged state only when that gate capacitance should be in the discharged state due to other circuit considerations. The resulting circuits because they are simple and controlled by already available clocks, are not now subject to spurious outputs and, when compared with prior art solutions, are both inexpensive and simple to fabricate. The approach utilized permits the operation of field effect transistor circuits into relatively high capacitance loads well above the usual 10pf normally required by circuit designers.

2. Description of the Prior Art

U.S. Pat. No. 3,517,210 shows a technique for solving a problem similar to that addressed by the teaching of the present invention. In the prior art, an inverter for use in a logic system receives data signals from a prior logic stage. The effect, at the inverter input, of the production of unwanted feed through signals derived from one clock pulse at the prior logic stage is neutralized by coupling another phase of the clock pulse to the gate of the inverter. An attenuation is introduced at the inverter input to correct for possible overcompensation of the data input signals to the inverter as a result of the coupling of the neutralizing clock pulses thereto. In a preferred prior art embodiment, the coupling of the neutralizing clock pulse phase is accomplished through a capacitor having one of its terminals connected to a source of the correcting clock pulse phase. However, the provision of the neutralizing clock pulse tends to cause an overcompensating effect to the data signal at the inverter FET. To eliminate the overcompensating effect, a second capacitor is coupled between the gate of the inverter FET and ground or some other reference potential to provide attenuation to the neutralizing clock pulse. As a result of the arrangement, logic signals corresponding to both the binary 1 and binary 0 level are accurately coupled to the data inverter despite the presence of unwanted signals caused by the feed through of clock signals and the overcompensating effects produced by the means for neutralizing the effects of the feed through of these clock signals.

While it is recognized that clamping a given point to a desired potential, is not per se novel, it should be appreciated that the present circuit provides such clamping at the proper time and with a minimum of additional circuitry.

The circuits of FIG. 1 and FIG. 3 labeled prior art are exemplary of the type of circuit used in the prior art where the problem of spurious outputs due to capacitive coupling in the output circuits existed. These circuits do not show prior art solutions but rather are exemplary of circuits which had the problem to which the arrangement of FIGS. 2 and 4 are believed to provide novel solutions.

SUMMARY OF THE INVENTION

The circuit for eliminating spurious outputs due to interelectrode coupling capacitance of the present invention, in its broadest aspect, comprises a clocked field effect transistor circuit the output capacitance of which is conditioned during a given clock cycle in response to either a high or low signal on the gate capacitance of an input field effect transistor. Means for converting an input signal to either a high or a low signal on the gate capacitance of the input field effect transistor is also provided. The gate capacitance of the input field effect transistor is clamped by means of a clamping circuit to the level of the low signal during a portion of the given clock cycle and is connected to the input field effect transistor and the converting means. Finally, means for isolating the converting means during the same portion of the given cycle is provided.

In accordance with more particular aspects of the present invention, a circuit capable of driving a load having a large capacitance is provided which includes a clocked field effect transistor inverter circuit the output capacitance of which is conditioned during a given clock cycle in response to either a high or a low signal on the gate capacitance of the input field effect transistor of the inverter. Means for converting an input signal on an associated input device to either a high or a low signal on the above mentioned gate capacitance is connected to the input field effect transistor of the inverter. Also provided are means for clamping the gate capacitance to the level of the low signal during a portion of the given clock cycle when the signal is low connected to the input field effect transistor and the converting means. Finally means for isolating the converter means during the same portion of the given cycle are provided.

In accordance with more particular aspects of the invention, a circuit capable of driving a load having a large capacitance is provided comprising in combination, a clocked field effect transistor circuit the output capacitance of which is conditioned during a given clock cycle in response to either a high or low signal on the gate capacitances of a first pair of input field effect transistors. Means are also provided for converting an input signal to either a high or low signal on either of the gate capacitances of the first pair of input field effect transistors. Means for clamping the gate capacitances to either the level of a high or low signal during a portion of the given clock cycle when the input signal is high or low connected to the first pair of the input field effect transistor and the converting means is also provided. Finally, means for isolating the input signal on the converting means during the same portion of the given cycle is provided.

It is, therefore, an object of this invention to provide a circuit capable of driving a load having a larger capacitance (in excess of 10pf) then is presently driven in the prior art while eliminating spurious outputs due to interelectrode coupling capacitances.

Another object is to provide for the elimination of spurious outputs due to interelectrode coupling capacitances using circuit means which are simpler and more easily fabricated than prior art approaches.

Still another object is to provide a field effect transistor driver circuit which is capable of providing a high current combined with fast response.

The foregoing and other objects, features and advantages of the invention will become apparent from the following more particular description of a preferred embodiment of the invention as illustrated in the accompanying drawings.

DESCRIPTION OF PREFERRED EMBODIMENTS

Figure 1:
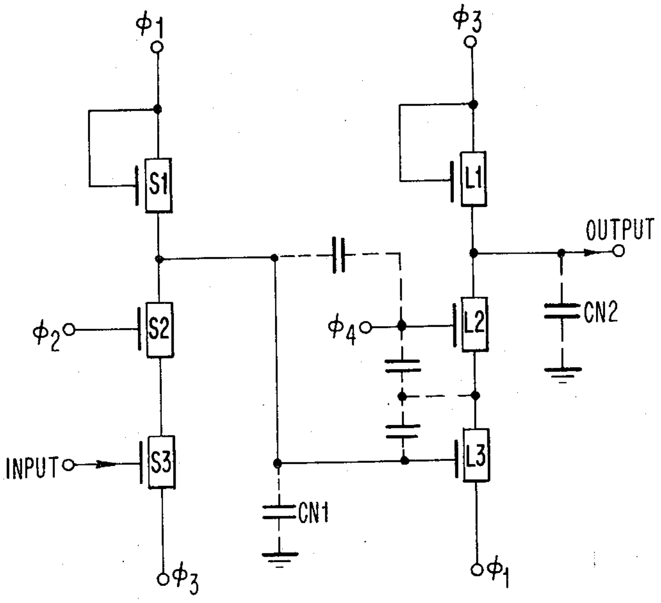
FIG. 1 PRIOR ART
FIG. 1 is a schematic diagram of a prior art circuit designed to drive a large capacitance but subject to providing spurious outputs via interelectrode coupling capacitance to the control electrode of a field effect transistor of the output inverter circuit.

The advantages of dynamic insulated gate field effect transistor circuits utilizing a multi-phase clocking technique for memory or logic applications can be briefly stated as; (a) smaller chip area, (b) lower power dissipation, and (c) higher speed. One of the serious circuit design problems in dealing with this type of circuit is that noise feed through due to interelectrode capacitances (gate-to-source or gate-to-drain capacitance) will not permit the circuit to function properly. For example, in a typical dynamic shift register arrangement shown in FIG. 1, node capacitance CN1 is charged up by applying a positive voltage +V during the clock interval $\phi1$ as shown in FIG. 1A to an input inverter circuit. During the interval $\phi2$, a positive voltage as shown in FIG. 1A is applied to the gate electrode of field effect transistor S2. During the $\phi2$ interval, if the input signal on the gate of field effect transistor S3 is positive so as to render field effect transistor S3 conductive, node capacitance CN1 discharges via conductive field effect transistors S2 and S3 to ground. Note in FIG. 1A that during the $\phi2$ interval, the potential due to the $\phi3$ clock is at ground potential. In a normal operation, a pulsed source operable during the $\phi3$ interval precharges capacitance CN2 via field effect transistor L1. However, during the $\phi4$ period, the node of CN1 is at a very high impedance level (floating) and a capacitive voltage divider is formed at CN1 which raises the voltage of CN1 during the $\phi4$ interval. If this feed through voltage is greater than the threshold of input transistor L3, capacitance CN2 will be discharged erroneously via field effect transistors L2 and L3; the former being rendered conductive by the application of a positive voltage to its gate during the $\phi4$ interval and the latter being rendered spuriously conductive by virtue of the spurious feed through voltage applied to node capacitance CN1.

It is obvious that in a successful design of this circuit, node capacitance CN1 must be made much larger than the coupling capacitance between the terminal to which the $\phi4$ voltage is applied and CN1 in order to minimize the feed through voltage. For a design using identical geometry devices, this is not too difficult to achieve, although sometimes extra capacitance has to be added to CN1 (such as by additional diffusion area) in order to make the circuit stable. Unfortunately, if it is necessary to increase the size of L1, L2 or L3, such as the case when the last stage is to be made an output driver the feed through due to the increase of coupling capacitance usually limits the relative geometry differences between devices used by the two inverter stages. One possible solution is to increase CN1 without increasing the size of S1 S2 and S3 but at a great sacrifice in speed. Another solution is to use many stages and gradually build up the device size in each stage. This latter solution is, however, highly impractical inasmuch as cost and area considerations become prohibitive.

Figure 1A:
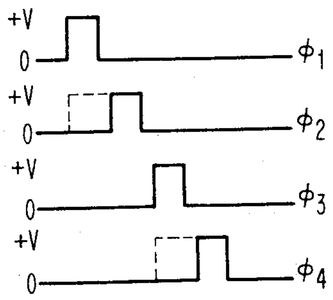
FIG. 1A shows the waveforms for phases $\phi1$–$\phi4$ which are provided by similarly labeled pulsed sources to dynamically operate the circuits of FIGS. 1–4. The dotted line waveforms indicate overlapping clock periods while the solid line waveforms indicate non-overlapping clock periods.
Figure 2:
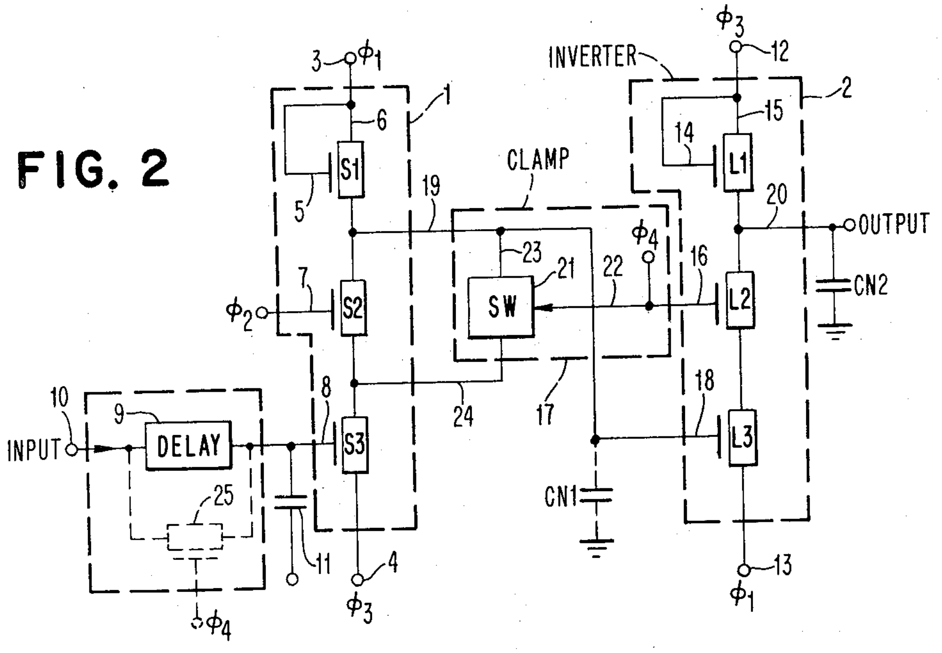
FIG. 2 is a partial schematic, partial block diagram of the circuit arrangement of FIG. 1 which incorporates a clocked clamping means which clamps the gate capacitance of the input device of the output inverter circuit to a low signal level when the input to the circuit is high.

Referring now to FIG. 2, a relatively simple solution to the above-cited problem is shown therein for a circuit similar to that shown in FIG. 1 and activated by the solid line waveforms shown in FIG. 1A. FIG. 2 shows a circuit which is basically similar to that shown in FIG. 1 with the exception that clamping means and isolation means are included which eliminate the capacitively coupled feed through which caused spurious outputs to occur in the prior art arrangement. The circuit of FIG. 2 consists of first and second inverters 1, 2, respectively. Inverter 1 which may be characterized as a means for converting an input signal to either a high or a low signal at its output, consists of three serially connected field effect transistors S1, S2 and S3. These transistors are of a commercially available type well known to those skilled in the art and may be N-channel or P-channel devices. For purposes of exposition, field effect transistors S1–S3 will be characterized hereinafter as N-channel enhancement mode devices. Such devices are normally non-conducting or in the OFF state with zero bias on their gate electrodes and are rendered conductive by the application of a positive voltage on their gate electrodes. Inverter 2 is similar to inverter 1 except that the serially connected field effect transistors thereof are of a larger size to handle the higher current requirements needed to drive a load having a large capacitance. The transistors of inverter 2 are therefor designated L1, L2 and L3. Returning now to inverter 1 the serially disposed devices S1–S3 are connected to pulsed sources designated by the reference characters $\phi1$ and $\phi3$ at terminals 3, 4, respectively. The pulsed sources designated by reference characters $\phi1$ and $\phi3$ may be any one of a large number of commercially available pulsed sources, well known to those skilled in the integrated circuitry art, which provide output overlapping or non-overlapping waveforms similar to those shown in FIG. 1A. The gate electrode 5 of device S1 is shown connected to the drain electrode 6 of device S1 causing that device to operate in a diode mode when pulsed source designated $\phi1$ operates. The gate 7 of device S2 is shown, in FIG. 2, connected to a pulsed source designated by the reference character $\phi2$. The gate 8 of device S3 is shown connected to a block entitled DELAY and further designated by the reference numeral 9 which is in turn connected to a terminal labeled INPUT and further designated by the reference numeral 10. A capacitance 11 connected to gate 8 of device S3 represents the gate capacitance of device S3.

Referring now to inverter 2, electrodes 12, 13 are shown in FIG. 2 connected to pulsed sources designated by the reference characters $\phi3$, $\phi1$, respectively. In FIG. 2 device L1 has its gate electrode 14 connected to its drain electrode 15, while gate 16 of device L2 is shown connected to a dotted block 17 and further designated as CLAMP in FIG. 2. Gate 18 of device L3 is shown connected via lead 19 to a common connection between devices S1, S2. Capacitance CN1 connected to gate 18 of device L3 represents the gate capacitance of device L3. Similarly, in inverter 2, a common connecting point between devices L1 and L2 is connected via lead 20 to a capacitance labeled CN2 which represents a large capacitive load which is to be driven by inverter 2. Clamp 17 contains an actuable switch 21, further labeled SW in FIG. 2 which assumes an ON or conducting state in response to a pulse applied at electrode 22 from a pulsed source designated by the reference character $\phi4$ in FIG. 2. Device L2 of inverter 2 is similarly rendered conductive by the presence of a pulse from pulsed source $\phi4$ on electrode 22. Switch 21 which may be a field effect transistor similar to device L2 or any other actuable switch, is also connected via lead 23 to lead 19 and via lead 24 to a common connection of devices S2 and S3.

In operation, the circuit arrangement of FIG. 2, if the contribution of switch 21 and delay 9 is ignored for the moment, operates exactly like the circuit arrangement of FIG. 1. Briefly, when pulsed source $\phi1$ is activated, device S1 is rendered conductive and capacitance CN1 is charged up via lead 19 conditionally. When pulsed source $\phi2$ operates to apply a positive voltage +V on gate 7 of device S2, device S2 is rendered conductive and, if device S3 is in a conducting state as a result of a positive voltage on its input, capacitance CN1 discharges via lead 19, and conductive devices S2, S3 to ground potential which is present on electrode 4 from pulsed source $\phi3$ at that instant. As a result, capacitance CN1 is at ground potential and device L3 is rendered non-conducting as a result of ground potential on its gate 18. When pulsed source $\phi3$ connected to electrode 12 of inverter 2 is actuated, output capacitance CN2 charges up via device L1 which was rendered conductive by the operation of pulsed source $\phi3$. However, because devices L1–L3 are relatively large, when pulsed source $\phi4$ goes ON, all of these devices are capacitively coupled and capacitance CN1 is spuriously charged up and cannot discharge because both devices S1 and S2 are in the OFF condition. Under these circumstances, a spurious output is provided on capacitance CN1 which turns device L3 into the ON or conducting stage via gate 18. Thus, when pulse source $\phi4$ operates rendering device L2 conductive, capacitance CN2 is discharged to ground via conducting device L2 and L3 and, the output which should have been high is now low. Where the input to device S3 renders device S3 non-conducting, capacitance CN1 remains charged and the spurious conditions which occur when device S3 is conductive does not occur.

To prevent the spurious charging of capacitance CN1 during the operation of pulsed source $\phi4$, capacitance CN1 is clamped to a low or ground potential by the actuation of switch 21 from pulsed source $\phi4$ via leads 23, 24, and device S3 which is ON to ground potential. Ground is provided by source $\phi3$ which is at ground potential at this time. From the foregoing, it should be appreciated that the clamping to ground potential has occurred during the desired interval (when $\phi4$ is operative) and that a portion of the path to ground has been provided by a conducting device S3 which is in series with a pulsed source $\phi3$ which is at ground potential during the interval $\phi4$. Here, it has been recognized that whenever capacitance CN1 should be at a low potential, the input to device S3 is always at a high potential thereby rendering device S3 conductive and providing a conductive path to ground for capacitance CN1 when pulsed source $\phi4$ is operative. Thus, a single device, switch 21, in conjunction with an already available device, solves the problem of spuriously charging capacitance CN1 in an extremely simple manner when compared with the approaches suggested or used by the prior art. The use of the conducting device S3 is significant in that switch 21 is operated each time pulse source $\phi4$ becomes operative. When, however, capacitance CN1 is charged up to a high potential, switch 21 does not provide a clamp to ground because device S3 is in the non-conducting or OFF state as a result of a low potential on its gate 8.

While the necessary condition of clamping capacitance CN1 to ground is fulfilled by having switch 21 and device S3 operative at the appropriate instant, this condition alone is not sufficient to insure that a spurious output will not appear at the output of inverter 2. It has also been recognized that if the input on terminal 10 of device S3 changes during the interval when $\phi4$ is operative, device S3 would be rendered inoperative and the clamping path to ground via switch 21 and S3 would be opened thereby permitting the spurious charging of capacitance CN1 during the operation of pulsed source $\phi4$ and resulting in the discharge of capacitance CN2 via operative devices L2 and L3. The changing of the input signal on terminal 10 during the operation of pulsed source $\phi4$ can be prevented by introducing a delay 9 of sufficient time delay to prevent any input signal from affecting the condition of S3 until the termination of the pulse from pulsed source $\phi4$. Alternatively, a field effect transistor 25 activated from pulse source $\phi4$ may be placed in series with gate 8 of device S3. This device would be of a complementary type to all the other field effect transistors utilized in the circuit of FIG. 2. Device 25 is a P-channel device which is normally conducting with zero bias on its gate. The application of a pulse from pulsed source $\phi 4$ renders device 25 non-conducting thereby preventing any change at the input which might affect the desired output.

Figure 3:
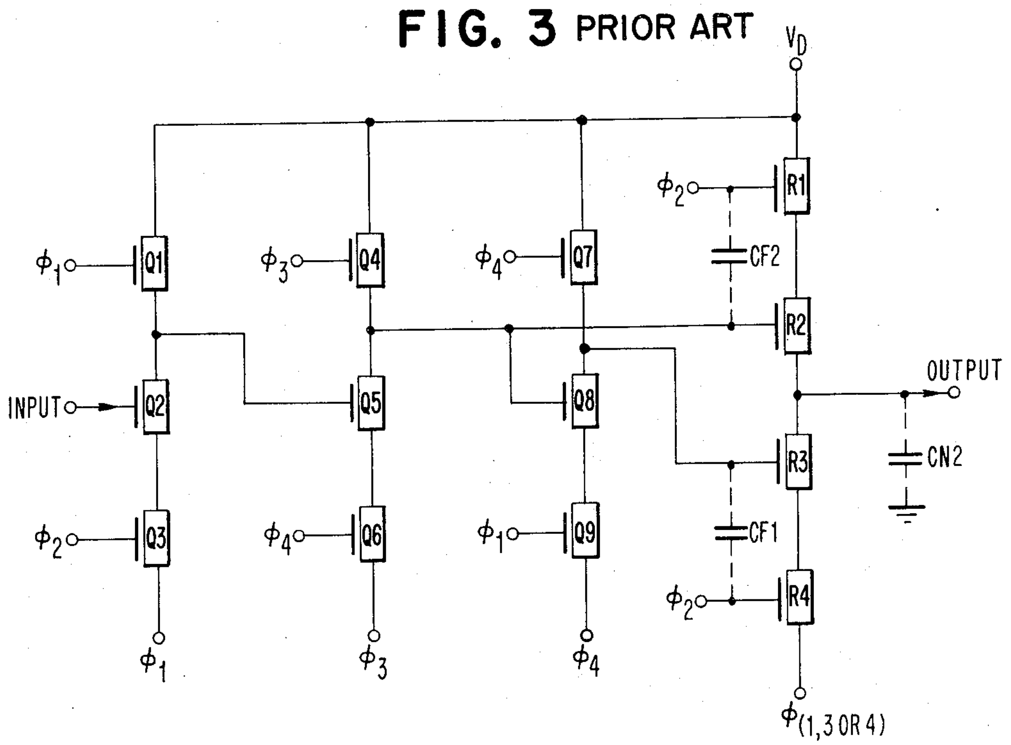
FIG. 3 PRIOR ART
FIG. 3 shows a schematic diagram of a prior art circuit which acts as an interface between dynamic and static logic which is subject to providing spurious outputs due to interelectrode coupling capacitance in its output driver portion.

Referring now to FIG. 3 there is shown therein a circuit for providing an interface between dynamic and static logic. Without going into a detailed explanation of the circuit construction and operation at this time inasmuch as its operation will become clear after a detailed discussion of FIG. 4, let it suffice to say that the circuit of FIG. 3 is designed to provide at its output terminal either a high or low signal level depending upon the type of binary input applied to the input of transistor Q2. Assume for purposes of explanation that field effect transistor R2 is ON or in the conducting state and field effect transistor R3 is OFF or in the non-conducting state as a result of an appropriate input on device Q2. Also assume that cycling through the four clock phases until the $\phi 2$ pulsed source is again actuated has occurred. At this time, because of the coupling capacitances between the gates of devices R1 and R4 and the gates of devices R2 and R3, respectively, a signal can be fed through via coupling capacitances CF1 and CF2 as shown in FIG. 3. Because device R2 is in the ON or conducting condition, the application of an additional voltage via CF2 does not disturb the operating condition of device R2. However, because device R3 is in the OFF or non-conducting condition, the voltage coupled via capacitance CF1 is sufficient to turn device R3 from its OFF or non-conducting state to an ON or conducting state. Under these circumstances, output capacitance CN2 can discharge via spuriously ON device R3 and device R4 (which is in the conducting state due to pulsed source $\phi 2$) to ground. The same problem occurs when device R2 is OFF and device R3 is ON.

Figure 4:
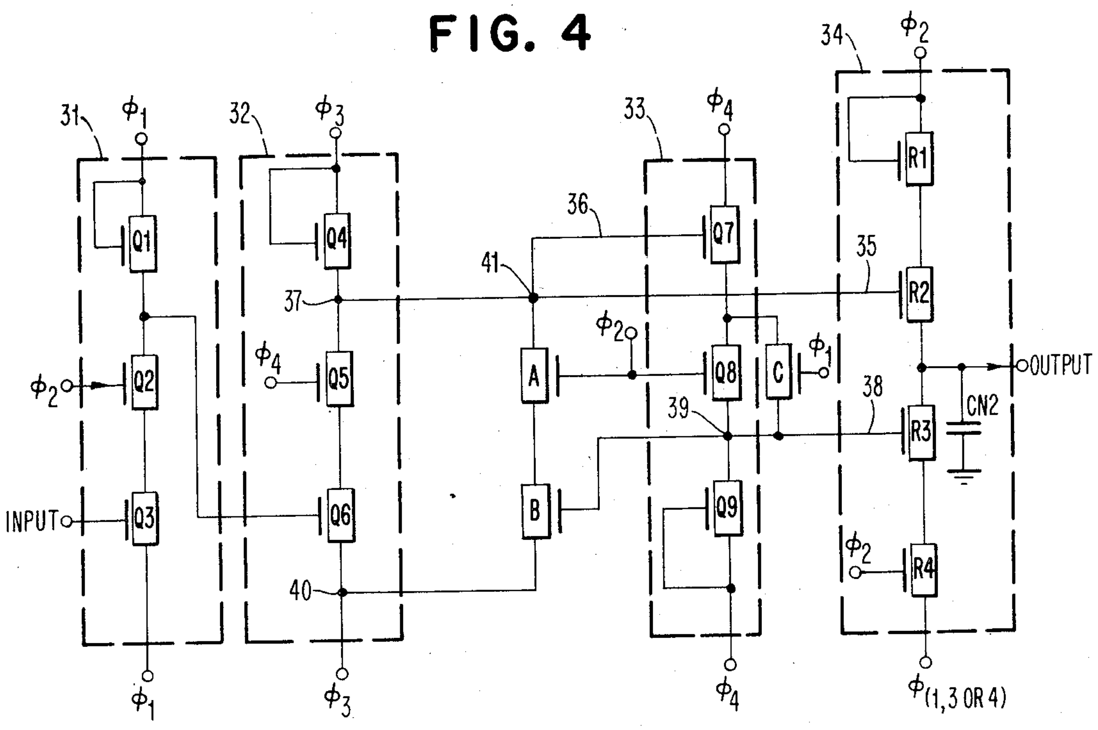
FIG. 4 is a schematic diagram of a circuit of FIG. 3 similar to that which utilizes overlapping periods and further including clocked clamping circuits which are adapted to maintain either of the input field effect transistors of the output circuit at a high or low signal level as required.

The circuit of FIG. 4 provides a solution to the problem indicated above. The circuit arrangement of FIG. 4 consists of first, second and third inverter stages 31, 32 and 33, respectively, and an output stage 34 which are actuated by the overlapping clock waveforms of FIG. 1A. Output stage 34 feeds a capacitance CN2 which is relatively large and, as such, requires a relatively high driving current.

Inverter 31 consists of three like field effect transistors labeled Q1, Q2 and Q3. These devices may be N or P-channel devices, but here, for purposes of illustration, they may be considered to be N-channel devices of a type which are commercially available. Inverter 31 is similar in every respect to inverter 1 of FIG. 2 and inverter 32 consisting of devices Q4, Q5 and Q6 is exactly the same as inverter 31 except that inverter 32 is connected to pulsed source $\phi 3$ at its extremities. Inverter 33, consisting of field effect transistors Q7, Q8 and Q9 is similar to inverters 31 and 32 except that the position of inverter 33 is inverted relative to the other two inverters. Thus, device Q9 is similar to devices Q1 and Q4, Q8 is similar to devices S2 and S5 and Q7 is similar to devices Q3 and Q6. Output circuit 34 comprises field effect transistors R1–R4 which are of relatively larger size than the other transistors of the circuit arrangement of FIG. 4 so that relatively large currents may be delivered to output capacitance CN2. Devices R1–R4 are disposed in series relationship with the drain of one device being connected to the source of another device. Device R1 is connected as a diode and is connected to a pulsed source $\phi 2$. The gate 35 of device R2 is connected in parallel with the gate 36 of device Q7. Gates 35 and 36 are connected to a node 37 which is disposed between Q4 and Q5 of inverter 32. Gate 38 of device R3 is connected to a node 39 which is disposed between device Q8 and Q9. Field effect transistor devices A and B are serially connected; one terminal of device B being connected to pulsed source $\phi 3$ at 40. One terminal of device A is connected in parallel with gates 35 and 36 at node 41. A field effect device C is connected in parallel with device Q8 and has its gate connected to pulsed source $\phi 1$. The gate electrode of device Q8 is connected to the gate electrode of field effect transistor A and both are connected to a pulsed source $\phi 2$. The gate electrode of device B is connected to point 39 which in turn is connected to gate 38 of device R3. The field effect devices A, B and C are connected in such a way that gates 35 and 38 are held in a high or conducting condition or a low or non-conducting condition at the appropriate times. Thus, when R2 is non-conducting gate 35 is clamped to ground at the appropriate instant while gate 38 of R3 is held at a high potential during the same interval. Also, when gate 38 of R3 is low, it is held at ground potential at the same time gate 35 of R2 is held at a high potential. This will become clear from the following description of the operation of the device of FIG. 4.

Assuming that a low voltage is applied to the input of device Q3 of inverter 31 rendering device Q3 in the non-conducting state when pulsed source $\phi 1$ is actuated, device Q1 is rendered conducting charging up the gate capacitance of device Q6 to the voltage of pulsed source $\phi 1$. After $\phi 1$ is pulsed OFF, pulsed source $\phi 2$ goes ON rendering device Q2 operative and device Q1 inoperative. Because Q3 is OFF, the gate capacitance of device Q6 remains charged in spite of the fact that device Q2 is rendered operative. When pulsed source $\phi 3$ is activated, the gate capacitances of gates 35 and 36 of devices R2 and Q7, respectively, are charged up via device Q4 and nodes 37 and 41. When pulsed source $\phi 4$ goes ON, device Q5 is rendered operative and the gate capacitances of devices R2 and Q7 are discharged via nodes 41 and 37 and devices Q5 and Q6. At this point, it should be recalled that device Q6 is operative as a result of the retained charge on its gate after the clock cycles of pulsed sources $\phi 1$ and $\phi 2$ thereby completing a path to pulsed source $\phi 3$ which is at low or ground potential during the operation of pulsed source $\phi 4$. During $\phi 4$, the gate capacitance of gate 38 of device R3 is charged up via ON device Q9 and node 39. When the clock cycle begins over again, pulse source $\phi 1$ renders device C operative providing a by-pass around device Q8 which is inoperative at this time. However, because device Q7 had the capacitance of its gate 36 discharged during the previous interval when pulsed source $\phi 4$ went ON, during the operation of pulsed source $\phi 1$ device Q7 is OFF and the gate capacitance of gate 38 of device R3 remains charged. Because the capacitance of gate 38 of device R3 remains charged, node 39 which is connected to the gate of device B is at the same potential and device B is rendered operative. Thus, when pulsed source $\phi2$ becomes operative, devices A, Q8, R1 and R4 are rendered operative. At this point, it should be recalled that it is during the interval when pulsed source $\phi2$ is rendered operative that feed through signals due to interelectrode coupling capacitances are capable of applying potentials to either gate 35 or gate 38 which are capable of turning one of the devices in the OFF condition to a spuriously ON condition. In the present instance, it should be recalled that the gate capacitance of gate 35 of R2 was discharged during a previous operation of the pulsed source $\phi4$ rendering device R2 inoperative. Thus, when pulsed source $\phi2$ goes ON, the coupling capacitances between gate electrodes can turn device R2 ON short circuiting the output stage to ground. This occurs because during $\phi2$ devices R1, R3 and R4 are ON and device R2 is spuriously ON. Spurious operation of device R2 is prevented by clamping node 41 to ground via device A which is ON as a result of the operation of pulsed source $\phi2$ and via device B which is ON as a result of being connected to node 39 which in turn is connected to the charged voltage on the gate capacitance of gate 38 of device R3 and via node 40 to pulsed source $\phi3$ which is at ground potential during the interval when pulsed source $\phi2$ is ON. Thus, devices A and B short the gate capacitance of gate 35 of device R2 to ground during the $\phi2$ interval preventing the spurious turn ON of device R2 due to interelectrode coupling capacitance.

If the charge conditions on gates 35 and 38 are reversed such that the gate capacitance of gate 35 is charged up and the gate capacitance of gate 38 of device R3 is discharged, devices R2 and R3 would be ON and OFF, respectively. Because the gate capacitance of gate 35 of device R2 is charged up, the gate capacitance of gate 36 of device Q7 is also charged up via node 41 and device Q7 is in the ON or conducting state. Also, because the gate capacitance of gate 38 of device R3 is discharged, the gate capacitance of device B is in the same condition via node 39. The condition of these devices, of course, indicates that a high voltage was initially applied at the input rendering device Q3 operative. Thus, when pulsed source $\phi1$ is operative for the second time, device C is rendered operative and gate 38 is clamped to ground via device C and device Q7 which had been previously rendered operative. Under these conditions, the gate capacitance of gate 38 of device R3 is discharged to pulsed source $\phi4$ which is at ground potential during the operation of pulsed source $\phi1$. When pulsed source $\phi$ 2 operates, devices A, Q8, R1 and R4 are rendered operative. Under these circumstances, output capacitance CN2 charges via devices R1 and R2 to the potential of pulsed source $\phi2$. At this point, the coupling capacitance between the gates of the output circuit would spuriously render device R3 operative thereby discharging capacitance CN2 to ground providing a low output when it should be high. However, because device Q8 is rendered operative by the operation of the pulsed source $\phi2$, gate 38 is clamped via node 39, device Q8 and operative device Q7 to ground which is the potential of pulsed source $\phi4$ during the interval when pulsed source $\phi2$ is operative. At the same time, node 39 is clamped to ground potential thereby rendering device B inoperative and holding node 41 at the potential of pulsed source $\phi2$ even though device A is rendered operative. Under such circumstances, output capacitance CN2 charges to the potential of $\phi2$. When $\phi1$ or $\phi3$ or $\phi4$ is applied to device R4, capacitance CN2 remains charged because device R3 has been held operative by clamping its gate 38 to ground via node 39 and devices Q7 and Q8.

While devices R2 and R3 are being clamped to the appropriate potentials as indicated above, inverter 32 acts to isolate output circuit 34 from any undesired change on devices R2 and R3 which could occur due to a change in the input signal. Thus, any spurious change which may have occurred at the input during the $\phi1$ and $\phi2$ intervals cannot affect the output, because inverter 32 is controlled by pulsed sources $\phi3$, $\phi4$ which are at ground potential during the $\phi1$ and $\phi2$ intervals. Thus, even if the input changed and Q6 were conditioned, this change cannot be transmitted to affect the output stage until pulsed sources $\phi3$, $\phi4$ are again actuated. Inverter 32, in addition to providing a control signal to output stage 34 simultaneously acts to isolate the input from the output.

The circuits shown hereinabove may be operated with overlapping or non-overlapping waveforms with little or no modification. With the circuit arrangements shown hereinabove, it is possible to design high power driver circuits on the semiconductor chip and thereby achieve better speed response with serious design problems due to capacitive feed through.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit capable of driving a load having a large capacitance comprising, in combination, a clocked field effect transistor circuit having an output capacitance and at least an input field effect transistor having a gate interelectrode capacitance associated therewith the former capacitance being conditioned during a given clock cycle in response to one of a high and low signal on the latter capacitance, means for converting an input signal from a signal source to one of a high and low signal on said latter capacitance, means for clamping said latter capacitance to the level of said low signal during a portion of said given clock cycle connected to said at least an input field effect transistor and said converting means, and, means for isolating said converting means from said source during said same portion of said given cycle.

2. A circuit capable of driving a load having a large capacitance comprising; in combination, a clocked field effect transistor inverter circuit having an output capacitance and an input field effect transistor having a gate interelectrode capacitance associated therewith the former capacitance being conditioned during a given clock cycle in response to one of a high and low signal on the latter capacitance, means for converting an input signal from a signal source on an associated input device to one of a high and low signal on said latter capacitance connected to said input field effect transistor, means for clamping said latter capacitance to the level of said low signal during a portion of said given clock cycle when said signal is low connected to said input field effect transistor and said converting means; and, means for isolating said converting means from said source during said same portion of said given cycle.

3. A circuit according to claim 2 wherein said means for converting includes a field effect transistor inverter circuit.

4. A circuit according to claim 2 wherein said means for clamping said latter capacitance to the level of said low signal includes a switch connected between said latter capacitance and said associated input device both said switch and said device being operative during said portion of said given clock cycle to connect said latter capacitance to said low signal level.

5. A circuit according to claim 2 wherein said means for isolating said converting means includes a delay device connected to said associated input device to prevent an input initially applied thereto from changing during said same portion of said given cycle.

6. A circuit according to claim 5 wherein said delay device is a clocked field effect transistor.

7. A circuit according to claim 6 wherein said delay device is a clocked field effect transistor which is nonconducting during said same portion of said given cycle.

8. A circuit capable of driving a load having a large capacitance comprising, in combination, a clocked field effect transistor circuit having an output capacitance and a first pair of input field effect transistors having gate interelectrode capacitances associated therewith the former capacitance being conditioned during a given clock cycle in response to a high and low signal on said gate interelectrode capacitances, means for converting an input signal from a signal source to a high and low signal on said gate interelectrode capacitances, means for clamping one of said gate interelectrode capacitances to the level of a low signal during a portion of said given clock cycle when said input signal is high or low connected to said first pair of input field effect transistors and said converting means, and, means for isolating said input signal on said converting means during said same portion of said given cycle.

9. A circuit according to claim 8 further including a second pair of field effect devices operative during the same portion of said given clock cycle each one of said second pair being connected to different one of said first pair of transistors, one of said second pair and one of said first pair forming a charging path for said output capacitance, the other of said second pair and the other of said first pair forming a discharging path for said output capacitance, a common point of said first pair being connected to said output capacitance.

10. A circuit according to claim 8 wherein said means for converting includes first, second and third inverter circuits, the output of said first inverter being connected to the input of said second inverter, the output of said second inverter being connected in parallel to the input of said third inverter and one of said first pair of input transistors of said circuit to provide either a high or low signal on the gate interelectrode capacitance of said one of said pair of input transistors, the output of said third inverter being connected to the other of said first pair of input transistors to provide either a high or low signal on the gate interelectrode capacitance of said other of input transistors of said pair of input transistors, said signal on one of said first pair being high when the signal on the other of said first pair of input transistors is low.

11. A circuit according to claim 8 wherein said means for clamping includes a first switchable path connected to the level of said low signal on said converting means and the gate interelectrode capacitance of one of said input field effect transistors and, a second switchable path connected to the level of said low signal on said converting means and the gate interelectrode capacitance of the other of said input field effect transistors one of said switchable paths being closed when the other is open.

12. A circuit according to claim 10 wherein said means for isolating said input signal on said converting means includes said second inverter the output of which is fixed during said same portion of said given cycle.

13. A circuit according to claim 11 wherein said first switchable path includes a pair of serially connected field effect transistors one of said serially connected pair being connected to the gate of said one of said pair of input field effect transistors, the other of said serially connected pair being connected to a pulsed source which is at said level of said low signal during said portion of said given cycle, the gate of said one of said serially connected pair being connected to a different pulsed source which is operative during said portion of said given cycle, the gate of said other of said serially connected pair being connected to the gate of the other of said pair of input field effect transistors, said first switchable path being closed when the gate capacitances of said one and said other of said pair of input field effect transistors are at low and high signal levels, respectively, and when said one of said pair of serially connected transistors is activated by said different pulsed source.

14. A circuit according to claim 11 wherein said second switchable path includes a portion of said converting means said portion comprising first and second serially disposed field effect transistors said first transistor being connected to the gate of said other of said input field effect transistors, said second transistor being connected to a pulsed source, which is at said level of said low signal during said portion of said given cycle, the gate of said first field effect transistor being connected to a different pulsed source which is operative during said portion of said given cycle, the gate of said second field effect transistor being connected to the gate of said one of said pair of input field effect transistors, said second switchable path being closed when the gate capacitances of said one and said other of said pair of input field effect transistors are at high and low signal levels, respectively, and when said first transistor is activated by said different pulsed source.

* * * * *